Dec. 26, 1961  R. MARINDIN  3,014,535
TRACTOR HYDRAULIC SYSTEM
Filed Nov. 18, 1957  5 Sheets-Sheet 4

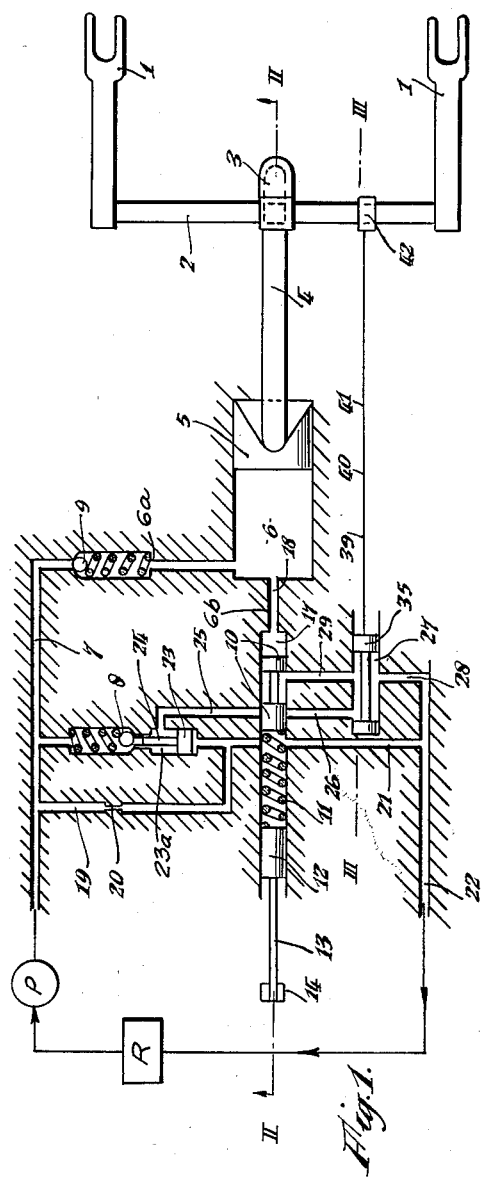

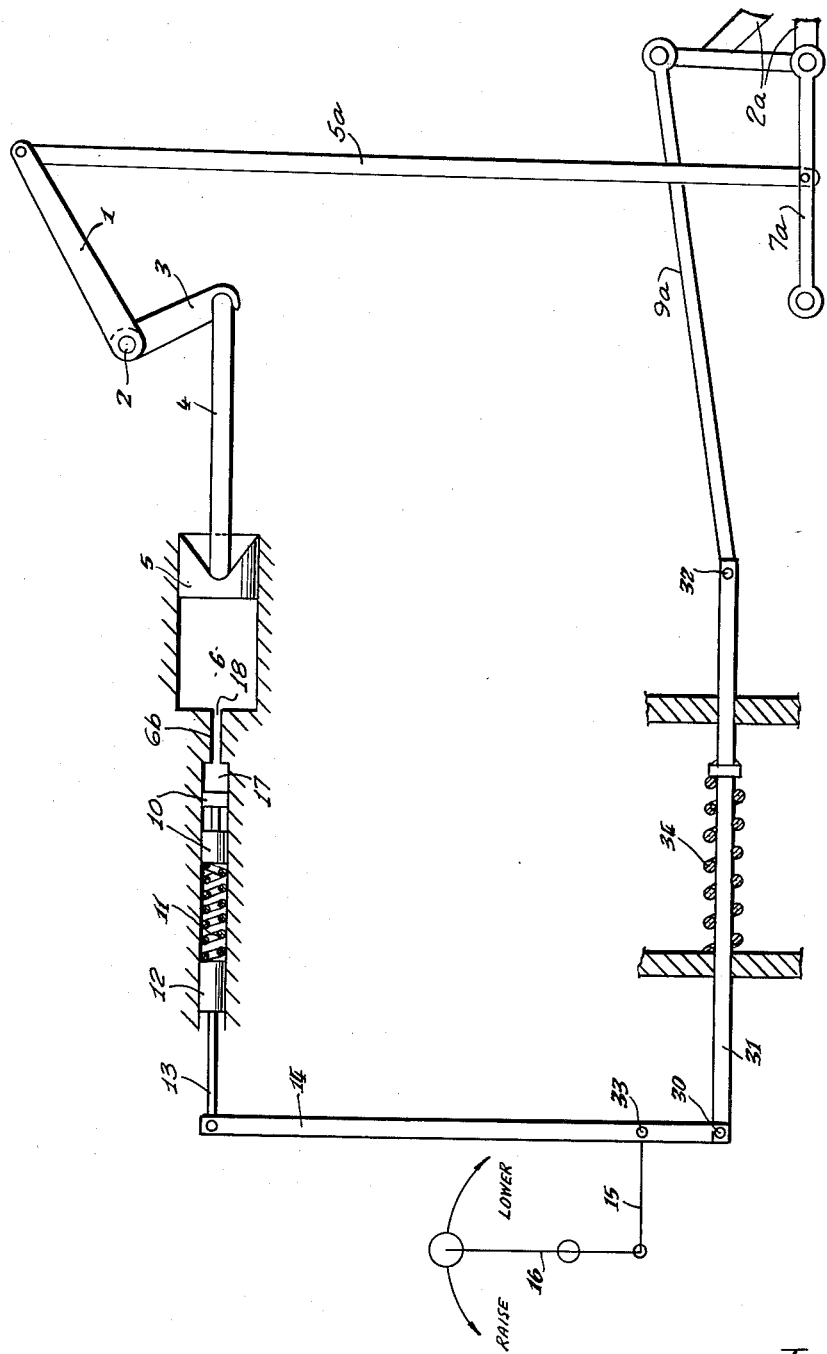

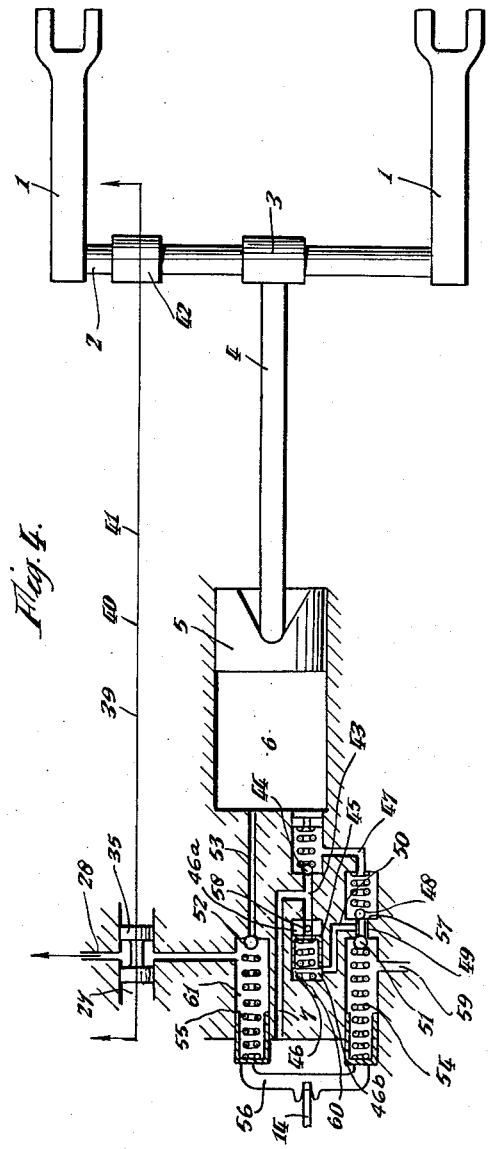

INVENTOR
ROBERT MARINDIN
Paul O. Pippel
ATTORNEY

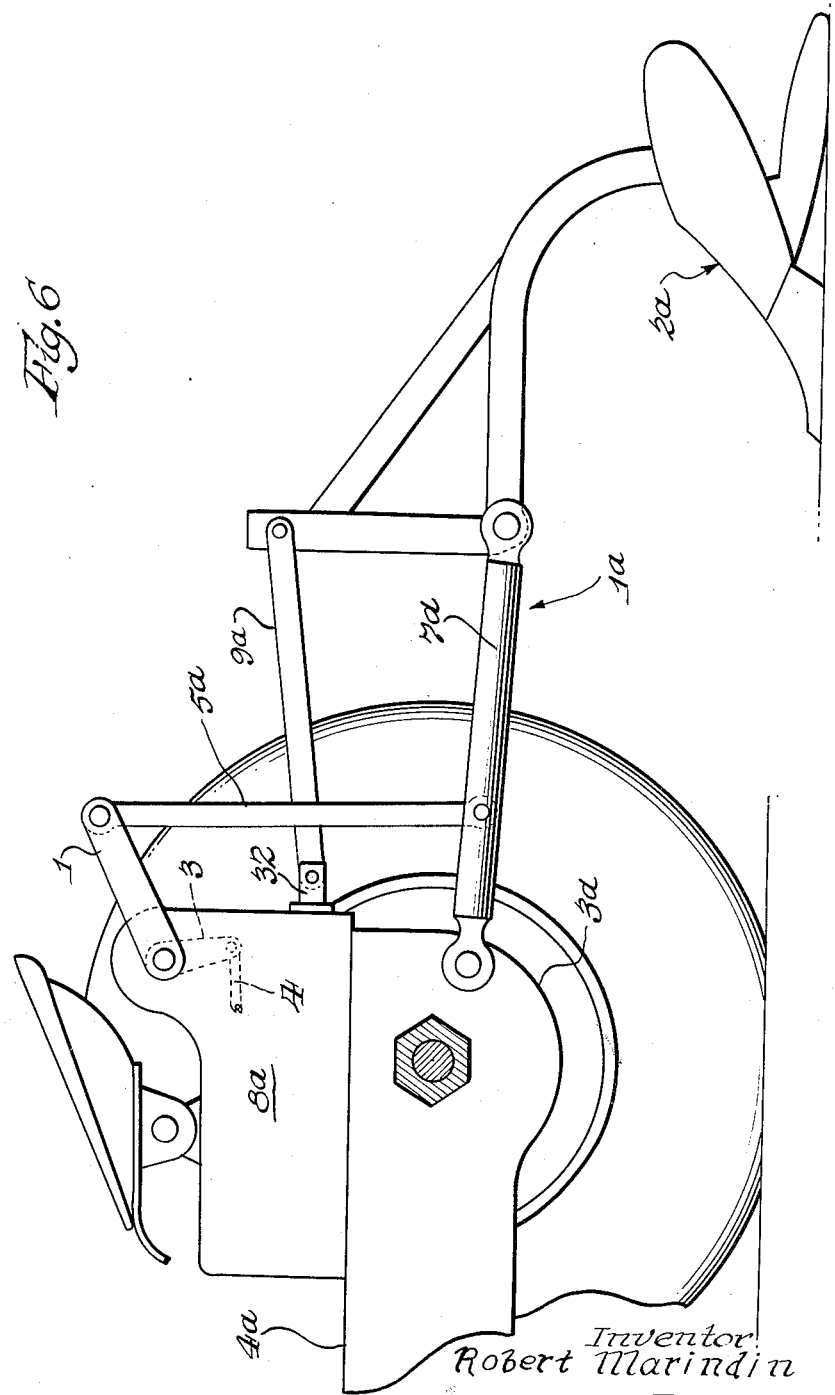

United States Patent Office 3,014,535
Patented Dec. 26, 1961

3,014,535
TRACTOR HYDRAULIC SYSTEM
Robert Marindin, Doncaster, England, assignor to International Harvester Company, Chicago, Ill.
Filed Nov. 18, 1957, Ser. No. 697,055
Claims priority, application Great Britain Nov. 20, 1956
11 Claims. (Cl. 172—7)

This invention relates to agricultural tractors, and is particularly concerned with improvements in tractors having a linkage adapted to carry a plough or like earth-working implement and having a hydraulic power lift system including power lift means, such as a ram cylinder, for lifting or lowering the linkage and an implement carried thereby.

In the use of tractors of the above kind, in conjunction with a plough or like earth-working implement the maintenance of a substantially constant working depth of the implement is an important requirement. The linkage pivoted to the tractor is subject to an upward force due to the resistance of the implement to the pull of the tractor and, under normal conditions, to somewhat greater downward force due to the weight of the implement. A predetermined working depth of the implement is selected by applying, through the hydraulic power lift means, an additional upwardly acting force of such degree that the upward and downward forces acting on the linkage are in balance. Thus, by increasing or decreasing the hydraulic pressure applied to said power lift means, e.g. the ram cylinder, the normal working depth of the implement may be set to a higher or lower level as required.

Under substantially constant soil conditions and on flat terrain, the implement will remain at the preselected working depth. However, variations in the soil conditions will cause variations in draft of the implement and this, in turn, will cause variation in the degree of upward force acting on the linkage which will create an out-of-balance condition between the upward and downward forces and result in deviation of the implement from the pre-selected working depth. In practice, deviations from the pre-selected working depth due to this cause are infrequent, or not of serious consequence. If, however, the terrain has a rough or irregular surface, for example, presenting alternate ridges and depressions, fore and aft pitching movement of the tractor will tend to lift or lower the implement in relation to the ground and, as a result, substantial variations in the working depth of the implement will occur unless some means is provided for compensating for the pitching movement of the tractor.

Various proposals have been made for maintaining a substantially constant working depth of an implement under varying conditions, such as referred to above, but in all previous proposals automatic regulation of working depth of the implement to maintain it substantially constant as far as possible has been effected by means actuated by displacement of a draft-responsive member which, in the case of a three-point linkage, is usually the top link, against the action of spring-loading which normally provides a draft-balancing force. In one proposal, for example, mechanism controlled by movement of the draft-responsive member actuates a control valve for admitting or releasing pressure fluid to or from a ram cylinder of the hydraulic power lift system so as to counteract the tendency for the implement to fall below or rise above the predetermined working depth.

All such proposals depend for their action on movement of control mechanism effected by displacement of a draft-responsive member and thus, before correction is initiated, some appreciable degree of deviation of the implement upwardly or downwardy from the predetermined depth will have occurred or, particularly in the case of fore and aft pitching movement of the tractor, there will be a tendency to cause variation from the pre-selected working depth before correction can take place. In other words, in all such prior proposals there is an unavoidable time lag in the response of the automatic depth control means.

The present invention has for its object to provide improved automatic depth control means capable of re-acting substantially instantaneously for counteracting influences tending to raise or lower the implement from a predetermined working depth.

Although the invention is of particular application to implement-attaching linkages of the three-point type, it is of general application to any implement-attaching linkage, pivoted to a tractor and adapted to be raised or lowered by hydraulic power lift means, e.g. a linkage of the two-point type, in which an implement is rigidly supported by a pair of arms pivoted to the tractor, or a three-point linkage, modified for the attachment of an implement of the two-point type, e.g., according to the copending U.S. patent application Serial No. 444,752, filed July 21, 1954, now Patent No. 2,952,323, issued September 13, 1960.

The present invention is based on the fact that on occurrence of any deviating influence, particularly pitching movement of the tractor, resistance of the implement to vertical upward or downward movement in the soil will cause a change of pressure in the ram cylinder of the hydraulic power lift means connected to the linkage before any appreciable deviation of the implement from the pre-selected working depth takes place.

According to the present invention, in an agricultural tractor having an implement-attaching linkage adapted to carry an earth-moving implement, such as a plough, there is provided a hydraulic power lift system including power lift means, such as a hydraulic ram, operable for raising and lowering the implement and for selecting the operating depth of the implement by applying a predetermined pressure in said hydraulic power lift means whereby upward and downward forces acting on the linkage at the selected operating depth of the implement are in balance, wherein a substantially constant working depth of the implement is maintained by means in said system responsive to changes in pressure in the power lift means consequent on resistance of the implement to upward and downward movement relative to the ground and adapted to restore and maintain a predetermined pressure in the power lift means corresponding to the desired working depth of the implement.

The means responsive to changes in pressure in the power lift means may include an adjustably loaded relief valve communicating with the ram cylinder for determining a selected operated pressure therein and for permitting escape of fluid from the power lift means if an increase in pressure therein occurs. The means responsive to changes in pressure in the power lift means also may include a conduit communicating with the power lift means through a non-return valve and receiving hydraulic fluid at high pressure from a pump, and a by-pass arrangement controlled by valve means responsive to variations in pressure in the power lift means so that normally a low pressure by-pass condition is established between said conduit and a return passage for the hydraulic fluid, and so that on a fall in pressure in the power lift means, the by-pass condition is terminated and hydraulic fluid at high pressure forced from the conduit to the power lift means through said non-return valve to restore and maintain the predetermined pressure in the power lift means corresponding to the desired working depth of the implement.

More specifically, the invention includes, in an agricultural tractor having an implement-attaching linkage adapted to carry an earth-working implement, such as a plough, a hydraulic power lift system including power lift means, such as a hydraulic ram, operable on said linkage for maintaining a substantially constant working depth of the implement, said system including an adjustably loaded relief valve communicating with the power lift means for determining a selected operating pressure therein and for permitting escape of fluid therefrom if an increase in the pressure in the power lift means occurs, a conduit communicating with the power lift means through a non-return valve and receiving hydraulic fluid at high pressure from a pump, means for normally establishing a low pressure by-pass condition whereby hydraulic fluid can flow from said conduit to a return passage at low pressure so long as the pressure in the power lift means remains constant according to the loading on said relief valve, and means sensitive to decrease in pressure in the power lift means for terminating said by-pass condition so that hydraulic fluid pressure in said conduit increases and hydraulic fluid at higher pressure is admitted to the power lift means through said non-return valve for restoring the selected pressure in said power lift means.

Establishment and termination of said by-pass condition may be controlled by movement of the adjustably loaded relief valve. Alternatively, establishment and termination of said by-pass condition may be effected by by-pass control valve means responsive to variation in pressure in the power lift means.

It will be appreciated that as hydraulic fluid is incompressible, a substantial change in pressure in the hydraulic power lift means can occur immediately there is any tendency for upward or downward movement of the linkage in relation to the tractor, and by using this change of pressure to control admission or release of pressure fluid to or from the hydraulic power lift means, a practically instantaneous counter-balancing reaction is obtainable so that the degree of pressure in the power lift means corresponding to the selected working depth can be restored and maintained without appreciable deviation of the implement from said selected working depth.

It will be understood that the linkage is so designed and arranged that under working conditions the upwardly acting forces thereon are less than the downwardly acting forces due to the weight of the implement and thus, by applying a suitable degree of pressure in the power lift means to exert additional lifting force, a state of balance between the upwardly and downwardly acting forces can be achieved corresponding to a selected working depth which, it will be understood, is variable in known manner by varying the predetermined pressure in the hydraulic power lift means. When a change in pressure due to external influence occurs, the means, according to the invention, sensitive to such change in pressure immediately reacts to restore the predetermined pressure so that the pressure change is only momentary and of insufficient duration to result in any appreciable deviation of the implement from the selective working depth.

The hydraulic power lift system may include an additional valve operatively connected to a movable part of the power lift means, e.g. a drop arm on a lift arm rock shaft, through a linkage controlled by a manually operable member, said additional valve controlling escape of fluid from the power lift means and, in accordance with the setting of said member, determining the point in the lowering movement of the linkage at which escape of fluid from the power lift means is cut off, the arrangement providing a fixed position control means over-riding the automatic depth control action of the hydraulic system.

The loading of the relief valve may be adjustable by a manual control member which is also operable for raising the linkage and implement carried thereby from working position to transport position and vice versa.

The means for adjusting the loading on the relief valve may be operable by a manual control member and also may be controlled by displacement of a draft-responsive member of the linkage in such manner that the loading on the relief valve is increased or decreased according to increase or decrease in the draft of the implement. Thus, the system may operate with automatic draft control while, on occurrence of draft overload, pressure in the hydraulic power lift means is increased to raise the linkage and the implement carried thereby.

The invention is hereinafter described, by way of example, with reference to the diagrammatic drawings in which:

FIG. 1 is a diagrammatic plan view of hydraulic power lift mechanism showing in section one embodiment of control means according to the invention, responsive to changes in pressure in the hydraulic ram cylinder or power lift means;

FIG. 2 is a section on the line II—II, FIG. 1, showing also an arrangement enabling auxiliary control by a draft-responsive member of the linkage;

FIG. 4 is a view similar to FIG. 1 illustrating a modification; and

FIG. 6 is a view of the rear portion of a tractor using a hydraulic hitch.

Figure 3:
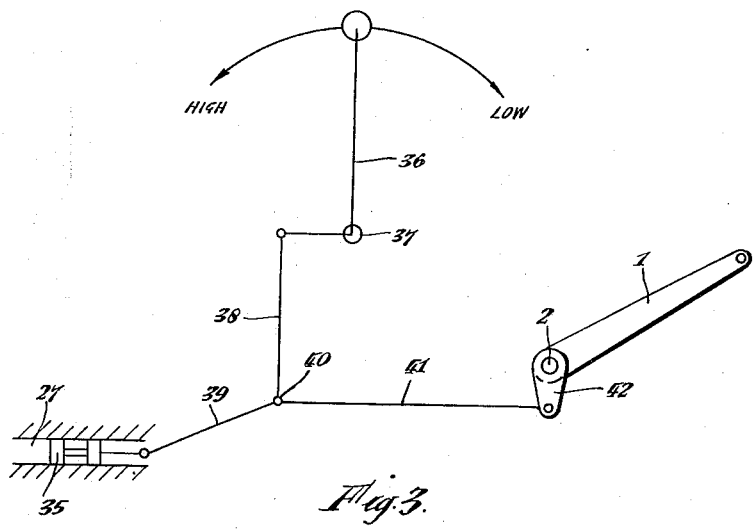
FIG. 3 is a section on the line III—III, FIG. 1.

In carrying the invention into effect according to one embodiment, and with reference to FIGS. 1, 2, 3 and 6 of the drawings, the invention is shown as applied to a hydraulic power lift system for use, for example, in conjunction with a conventional three-point linkage 1a connected to implement or plough 2a and located at the rear end 3a of tractor 4a and comprising a pair of lift arms 1 adapted at their outer ends for connection by downwardly extending links 5a to the lower links 7a of the three-point linkage 1a, the arms 1 being carried by a rock shaft 2 provided with a downwardly extending arm 3 within housing 8a and coacting with a rod member 4 operable by power lift means, e.g. a piston 5 in a hydraulic ram cylinder 6, having an inlet passage 6a and an outlet passage 6b.

Hydraulic fluid, i.e. oil, delivered under pressure from a pump p is conducted through a passage 7 to non-return valves 8 and 9, the valve 9 being arranged to admit the oil under pressure to the ram cylinder 6. Pressure of oil in the cylinder 6 is governed by the degree of pressure exerted on a relief valve, in the form of a piston 10, by a spring 11, the loading of which is controlled through a piston 12, piston rod 13, lever 14 and link 15 from a manually controlled lever 16 (FIG. 2), the piston 10 being disposed in a channel or cylinder 17 communicating with the cylinder 6 through a passage 18. In the position shown in the drawing, the piston 10 allows oil under pressure flowing from the passage 7 through a passage 19 and restriction 20 to pass to and through a passage 21 and a passage 22 for return to a tank or reservoir R from which the pump P draws its supply. If the piston 10 is in a state of equilibrium between the pressure in the cylinder 6 and the pressure of the spring 11, i.e. with the implement 2a operating normally at the selected working depth, the piston 10 will be disposed to the left of the position shown in FIG. 1 at such position that the passage 21 is blanked off. A by-pass means comprises a restriction 20; a by-pass valve means in the form of a valve piston 23; chamber 23a, projection 24 and non return valve 8; and by-pass discharge passage 25. Oil passing through the restriction 20 thus acts upon a piston 23 having a projection 24 which unseats the valve 8, thereby allowing the main flow of oil from the passage 7 to flow straight back to the tank R through the passages 25 and 26, cylinder 27, passage 28 and passage 22, the ports of passages 25 and 26 being uncovered by the piston 10 at the same time as, or slightly before, the piston 10 blanks off the passage 21 and a passage 29.

If any rise in pressure in the cylinder 6 takes place, the piston 10 will be displaced to permit escape of oil from the cylinder 6 through the passage 29 until the predetermined pressure in the cylinder 6 is restored. Under normal operating conditions, a predetermined pressure corresponding to a selected working depth of the implement 2a is applied in the cylinder 6 by oil which has been admitted through the non-return valve 9, and is at a pressure determined by the loading of the spring 11 on the piston 10.

Now the valve control mechanism comprising the piston 10 ram 5 and cylinder 6 is operable within a given range of pressures say in the approximate nature of 50 lbs. per square inch. This pressure fluctuation results from the fore and aft pitching of the tractor as it progresses over alternate ridges and depressions in the field which remain after harvest time as a result of preparing the field in a previous season for growing crops. The valve control mechanism is concerned not with variations in soil conditions such as soft or hard ground, but with variations in the terrain or surface of the field where the tractor is going across various ridges and depressions wherein two or more ridges do not extend beyond the length of the tractor.

If the tractor 4a pitches forwardly, i.e. the nose of the tractor is led forwardly and downwardly as the front wheels of the tractor 4a roll down the side of ridge and the rear part of the tractor 4a tends to be raised with respect to the forward end of the tractor 4a an upward force will be exerted on the linkage and on the implement 2a carried thereby and, due to the resistance of the earth above the plow 2a to vertical upward movement of the implement 2a, pressure in the ram cylinder 6 will rise substantially before any appreciable upward deviation of the implement 2a from its selected working depth can take place. The rise in pressure will force the piston 10 to the left against the action of the spring 11 until the passage 29, communicating through the cylinder 27 with the passage 28, is uncovered so as to release oil from the ram cylinder 6 until the pressure in the ram cylinder 6 is restored to the predetermined value depending on the setting of the control lever 16 and the consequent loading of the spring 11.

It is appreciated that as the ram cylinder 6 is being bled due to increase in pressure the implement will tend to be lowered into the ground but because the tractor 4a is moving forward the bottom of the depression is reached at which time the increase in pressure is alleviated and as the tractor pitches rearwardly pressure in the ram cylinder drops off to such an extent that fluid must be admitted to ram cylinder 6 in order to keep a constant pressure.

Should the tractor 4a pitch rearwardly, the resistance of the earth to downward movement of the implement 2a will result in a fall in pressure in the cylinder 6, whereupon the piston 10 will be displaced to the right by the spring 11 to the position shown in FIG. 1 in which the ports of the passages 25 and 26 are shut off and the passage 21 uncovered. This condition allows oil flowing through the restriction 20, and also the oil behind the piston 23, to flow back to the tank R so that the by-pass valve 8 closes, whereupon oil delivered at high pressure from the pump P will be forced into the cylinder 6 through the non-return valve 9 until the predetermined pressure in the ram cylinder 6 is again restored.

This constant rolling and pitching of the tractor over the undulated surface so actuates the valve control mechanism as to cause the earth-working implement to follow the contour of the ridges and depressions. Pressure variations between two successive ridges will be in an approximate range of a plus or minus 50 lbs. per square inch from the established equilibrium pressure. Furthermore, since the amount of pressure change in the cylinder 6 is relatively slight over substantially constant soil conditions, the implement 2a will not be given sufficient downward force to overcome the resistance of the ground under the implement resulting in little change in depth of the implement, the main feature of the valve control mechanism being that it adjusts the implement to follow in a subterranean pattern the ridges and depressions and maintains such implement below the ground at a depth in the neighborhood of 5 inches from the surface.

The working depth of the implement 2a depends on the predetermined pressure maintained in the ram cylinder 6 according to the setting of the control lever 16, equilibrium as regards working depth of the implement 2a being attained when the downwardly acting forces on the linkage, due to the weight of the implement, are counterbalanced by the upwardly acting forces consequent on the resistance of the imlement 2a to the pull of the tractor 4a, together with the pressure exerted by the hydraulic ram piston 5 through the lift arms 1. The lever 14, FIG. 2, pivots about the point 30 and thus, if the control lever 16 is moved anti-clockwise the lever 14 will be moved to the right to increase the loading on the spring 11, thereby increasing the pressure applied in the ram cylinder 6 and raising the implement 2a to a higher lever or, if desired, to a transport position. Movement of the control lever 16 in the reverse direction will decrease the loading on the spring 11, with the result that pressure in the ram cylinder 6 will be reduced and the implement 2a lower correspondingly.

Should the soil condition not remain constant as where the implement is pulled through alternately soft or hard ground such as sandy soil or clay, or where an obstruction in the ground is met or where the implement passes through a large depression in the ground, the changes in pressure fluctuations in the hydraulic ram cylinder 6 will be very great, say in the neighborhood of 500 lbs. per square inch and under these conditions the valve control mechanism alone will not be operable to compensate for the pressure variations.

As an additional safeguard against such overload, the fulcrum 30 of the lever 14 may be provided in a displaceable draft-responsive member 31 adapted, at 32, to be connected to the top link 8a of the three-point linkage 1a. If the draft increases, increased compression on the top link 9a will occur, as a result of which the member 31 will be displaced to the left and cause the lever 14 to pivot about the point 33 at which it is connected to the link 15, thereby compressing the spring 11 and moving the piston 10 to the right, with the result that, as before described, the pressure in the ram cylinder 6 will be increased for raising the implement, thus reducing the draft until the spring pressure and hydraulic pressure acting on the piston 10 are once more in equilibrium. If the draft is reduced, the member 31, under the influence of a spring 34, will be displaced so as to move the lever 14 in the reverse direction, thereby reducing the loading on the spring 11, which will cause the piston 10 to move to the left, and result in a corresponding drop in pressure in the ram cylinder 6 to allow the implement 2a to fall until equilibrium at the depth setting determined by the control lever 16 is again attained.

The arrangement above described involving control of the load on the spring 11 by means of a draft-responsive member 31, may be used to operate the system with automatic draft control, inasmuch as the load on the spring 11 is increased or decreased according to increase or decrease in the draft of the implement 2a.

According to a further feature, a piston valve 35 in the cylinder 27 is connected to a manually controllable lever 36, FIG. 3, pivoted at 37 by means of links 38, 39 which also are articulated at 40 to a link 41 connected to a drop arm 42 on the rock shaft 2. This arrangement provides additional control means applicable when the tractor is used with implements having little, if any draft action, e.g. implements other than ploughs or the like, and provides a fixed position control which over-rides the automatic depth control. If the rock shaft 2 rotates clockwise, due to pressure in the ram cylinder 6 being reduced consequent on movement of the control lever 16 in a clockwise direction, the right-hand land of the piston 35 will seal off the passage 29 according to the setting of the control lever 36. If the control lever 36 is moved anti-clockwise, the implement will not fall as far before shut off occurs as when the lever 36 is moved clockwise.

In the modification illustrated in FIG. 4, the oil delivered under pressure from the pump through the passage 7 is conducted to an inlet passage 43, one end of which communicates with the ram cylinder 6 through a non-return valve 44, while the other end is controlled by a by-pass piston valve 45 disposed in a by-pass cylinder or chamber 46, said chamber having a front portion 46a and a rear portion 46b, and constituting by-pass control valve. The ram cylinder 6 also communicates through an outlet passage 47 with a valve 48 which normally closes a passage 49 communicating through a passage 50 with the cylinder 46. A valve 51 coacts with a seating at the opposite end of the channel or passage 49 and a valve 52 coacts with a seating at the end of an outlet passage 53 communicating with the ram cylinder 6. The valve 51 is loaded by means of a spring 54 and the valve 52 by means of a spring 55. The valves 51 and 52 are of equal area and the loading on the springs 54 and 55 is simultaneously adjustable by movement of the lever 14 acting through a bridge member 56. The valve 52 is a relief valve which, according to the loading on the spring 55 depending on the setting of the lever 16 (FIG. 2) determines the pressure to be maintained in the ram cylinder 6.

Under normal working conditions the valves 48 and 44 are held on their seats by means of the pressure in the cylinder 6. The valves 51 and 48 and the stem 57 form a pressure responsive valve. The valve 52 is held on its seat by the spring 55. The valve 51 is held off its seat by means of the stem 57 which extends between the valves 51 and 48 and which is just long enough to prevent both valves seating at the same time. This allows oil behind the piston valve 45 to escape to the tank R, and as there is now no pressure on the back side of the valve 45, the pressure in the passage 43 will open it and allow the oil to flow via the by-pass return passage 58 back to the tank R. Due to the increase in area of the valve 45 when open, only a small back pressure will be required to maintain it in this position.

The loading on the spring 54 is slightly lower than the loading on the spring 55 so that when the whole system is at the pressure regulated by the valve 51, this valve will open and oil will commence to flow from the channel or passage 49 and a discharge return passage 59 for return to the tank R. This will cause the valve 48 to close and oil from the cylinder 46 can flow back through the passage 50 and passage 59 to the tank R, thus permitting the valve 45 to open due to pressure in the passage 43 so that oil delivered under pressure by the pump P through the passage 7 flows back to the tank R through the passage 43 and passage 58 at a much reduced pressure.

If an increase of pressure in the ram cylinder 6 occurs, oil will be released through the relief valve 52 until the predetermined pressure is restored. If, however, pressure in the ram cylinder 6 falls below the back pressure in the system established when the valve 45 is open, the valve 51 is closed by the spring 54 and oil under pressure will flow via the passage 50 to the large area of the valve 45, and as this valve is now hydraulically balanced, the spring 60 will close it. Oil under pressure from the pump P will flow from the passage 7 into the ram cylinder 6 through the non-return valve 44 and when the pressure in the system is sufficient to close the valve 48 against the loading of the spring 54, oil will again be allowed to flow from the cylinder 46 to the passage 59, whereupon the valve 45 is forced wide open by the pressure in the system to allow the flow of oil under pressure from the pump P to return to the tank R through the passage 58.

By operation of the lever 16 (FIG. 2) the loading on the springs 54 and 55 may be adjusted for raising or lowering the implement 2a.

The valve 35 of the over-riding fixed position control shown in FIG. 3 is, in this embodiment, arranged to control the passage 28 communicating with the chamber 61 in which the valve 52 is disposed.

Figure 5:
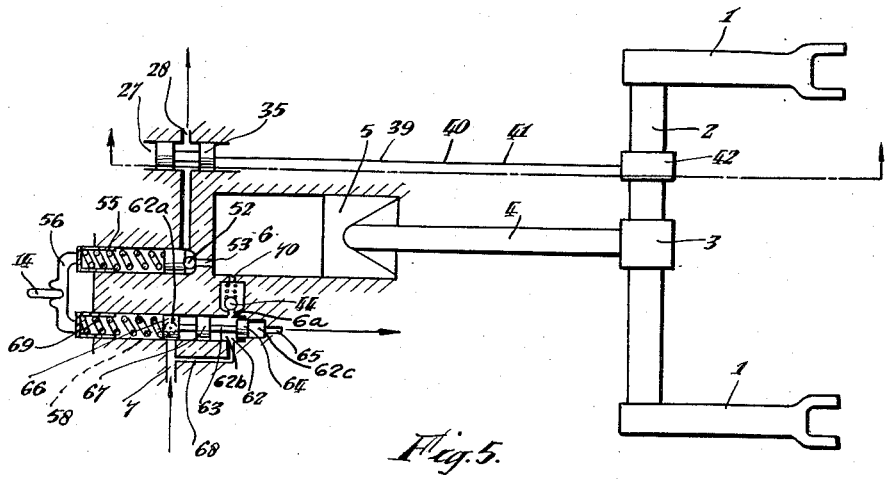
FIG. 5 is a view similar to FIG. 1 illustrating a further modification.

In a further modification illustrated in FIG. 5, the ram cylinder 6 communicates through the outlet passage 53 and release valve 52 with the reservoir return passage 28 which may be controlled by the adjustable shut off valve 35 as before described. The non-return valve 44, however, controls communication with a chamber 62 in which by-pass control valve means in the form of a piston valve 63 operates, said valve 63 having a land or valve member 64 controlling a discharge return passage 65 to the tank R and having lands 66 and 67 controlling communication between the inlet passage 7 from the pump P and the by-pass return passage 58. A restricted flow passage 68 communicates between the conduit or passage 7 and the chamber or channel 62, having first portion 62a, second portion 62b, and third portion 62c, the passage 68 opening into the chamber 62 between the land 67 and the valve member 64. The valve 63 is loaded by a spring 69 and the loading of the springs 55 and 69 is adjustable, as before described, by the lever 14 acting through the bridge member 56.

Oil delivered from the pump P through the passage 7 passes through the passage 68, chamber 62 and non-return valve 44 into the ram cylinder 6, the pressure in the ram cylinder 6 being controlled by the relief valve 52 and being determined by the loading on the spring 55. The non-return valve 44 in inlet passage 6a communicates with the ram cylinder 6 through a passage 70 which is of such size that it is incapable of passing the full flow of the pump P without building up pressure in the chamber 62 equal to or greater than the maximum pressure obtained at the valve 52. The pressure of oil in the chamber 62 acting on the differential areas of the land 67 and valve member 64 will cause the valve 63 to move to the left against the loading of the spring 69 until the inlet passage 7 is uncovered by the land 66 to allow the oil to flow back to the tank R through the return passage 58. The increase in area of the valve 63, which is subjected to back pressure from oil flowing to the tank R when the valve 64 is opened, is such that only a low pressure of oil from the passage 68 will be sufficient to keep the spring 69 compressed to allow return flow of oil through the passage 58.

If pressure in the ram cylinder 6 increases, oil will be released from the ram cylinder 6 through the relief valve 52 until the predetermined pressure in the ram cylinder is restored. If pressure in the ram cylinder 6 drops below the back pressure in the system with the valve 63 open, oil will flow through the non-return valve 44 to the cylinder 6 and, due to the fall in back pressure in the chamber 62, the spring 69 will close the valve 63 which is normally open, thus cutting off the passage 7 from the passage 58, whereupon oil will flow at full delivery pressure through the passage 68, chamber 62, non-return valve 44 and restricted passage 70 into the ram cylinder 6. As the pressure required to open the valve 63 is greater than that required to open the valve 52, flow will take place at the pressure determined by the loading on the valve 52 until the pressure in the chamber 62 is caused to rise by the restriction 70 sufficiently to open the valve 63, whereby oil passing through the passage 68 is returned to the tank R through the passage 65, the predetermined pressure in the ram cylinder 6 being maintained by closing of the non-return valve 44.

It will be appreciated that in the embodiments described, the hydraulic power lift system is capable of reacting substantially instantaneously to any change in pressure in the ram cylinder so as to restore and maintain a predetermined pressure and consequently a substantially constant operating depth of the implement 2a so that pitching movements of the tractor can take place substantially freely in relation to the implement 2a, while maintaining the upward and downward forces acting on the implement 2a in equilibrium according to the selected working depth.

It will be understood that the invention is not limited to the particular embodiments hereinbefore described and that the hydraulic power lift system may be otherwise arranged or adapted in any suitable manner so as to be operable in response to changes in pressure in the power lift means, e.g. the ram cylinder 6, for restoring and maintaining a predetermined pressure therein irrespective of pitching movement of the tractor 4a or other external influence tending to raise or lower the implement 2a from a selected operating depth.

I claim:

1. In a tractor having a rock shaft and an implement attaching linkage adapted to carry an implement, a hydraulic power lift system including a ram and ram cylinder operatively connected to said linkage through said rock shaft, said cylinder having an inlet passage, an outlet passage communicating therewith on the pressure side of the ram and a non-return valve within said inlet passage, a pump for delivery of fluid, a conduit communicating with said inlet passage of said cylinder and receiving hydraulic fluid at high pressure from said pump, a reservoir communicating with said pump and being a source of fluid for said pump, a return passage communicable with said reservoir, a relief valve communicating with said outlet passage of the cylinder for permitting escape of fluid from said outlet passage of said cylinder to said reservoir upon an increase in pressure in said cylinder, said valve having means for adjustable loading it, bypass means operatively connected between the pumps and the non-return valve for normally establishing a low pressure by-pass condition whereby hydraulic fluid under pressure can flow from said conduit to said return passage at low pressure so long as the pressure in the ram cylinder remains constant according to the loading on said relief valve and means sensitive to decrease in pressure being in fluid communication with the bypass means and the cylinder, said last mentioned means terminating the low pressure by-pass condition so that hydraulic fluid under high pressure from the pump is admitted to the ram cylinder through said non-return valve for restoring the selected pressure in the ram cylinder upon decrease in pressure in the ram cylinder.

2. In a tractor having an implement-attaching linkage adapted to carry an implement, a hydraulic power lift system comprising ram means including a cylinder and having a connection with the linkage, said cylinder having inlet and outlet passage means communicating therewith, said ram means being operable for raising and lowering the implement and for selecting the operating depth of the implement by applying a predetermined pressure in said cylinder whereby upward and downward forces acting on the linkage at the selected operating depth of the implement are in balance, a reservoir for fluid discharge from said cylinder, a hydraulic pump having fluid communication with said cylinder to feed fluid thereto, and means responsive to changes in pressure in said cylinder consequent on resistance of the implement to upward or downward movement relative to the ground operating to restore and maintain a predetermined pressure in said cylinder corresponding to the desired working depth of the implement, said means responsive comprising an adjustably loaded relief valve communicating with said passage means of said cylinder for discharge of fluid to said reservoir, a non-return valve within said passage means between said pump and said cylinder, bypass means having fluid connection between said pump and said non-return valve for establishing and terminating a bypass of fluid to the reservoir, and means having operative connection with the ram means and the bypass means and providing control of the bypass means in accordance with the pressure in the ram means.

3. A hydraulic power lift system according to claim 2, and said last mentioned means having connection with the relief valve wherein establishment and termination of the by-pass condition is controlled by movement of said adjustably loaded relief valve.

4. The invention according to claim 2 and a manual control member attached to said tractor and having connection with the relief valve for adjusting the loading on the relief valve to obtain the selected operating pressure and to raise and lower the implement for working and transport position.

5. The invention according to claim 2 and having a manual control lever member attached to said tractor and yieldable means between said manual control means and said relief valve, said yieldable means transmitting movement of said control lever means to adjust the loading on the relief valve for obtaining the selected operating pressure in said cylinder and to raise and lower said implement for transport and working position.

6. The invention according to claim 2, and said tractor having a rockshaft, and fixed position control means over-riding the automatic depth control action of the hydraulic system and comprising a piston valve and cylinder means communicable with said passage means, a drop arm on said rockshaft having means connecting said piston valve and cylinder means, and a manually operable member connected to said drop arm and being positionable to operate said piston valve and cylinder means for controlling the escape of fluid from said ram cylinder determining the point in the lowering movement of said tractor linkage at which escape of fluid is cut off.

7. The invention according to claim 2 and a draft responsive member connected to said implement attaching linkage and having means connecting the relief valve in force transmitting relation thereto for increasing and decreasing the loading on the relief valve according to increase or decrease in the draft of the implement.

8. The invention according to claim 2 and overload means comprising a resilient biased displaceable shaft responsive member connected to said implement attaching linkage and subject to forces transmitted by said responsive member and acting against said relief valve, said yieldable means transmitting movement of said draft responsive member for increasing and decreasing the loading on said relief valve according to increase and decrease in the draft of said implement.

9. In a tractor having an implement attaching linkage adapted to carry an implement, a hydraulic power lift system operable for raising and lowering the implement and for selecting the operating depth of the implement by establishing a predetermined pressure in said system whereby upward and downward forces acting on the linkage at the selected operating depth of the implement are in balance, said hydraulic power lift system comprising a cylinder having an inlet passage and an outlet passage communicating therewith on the pressure side of said cylinder, a ram reciprocally disposed within said cylinder, a reservoir return passage communicating with said outlet passage, a reservoir being a source of fluid and communicating with said return passage, a conduit communicable with said inlet passage, a pump receiving fluid from said reservoir and delivering fluid under high pressure through said conduit to said cylinder, a non return valve disposed within said inlet passage preventing return of fluid to said pump, a by-pass means communicating with said conduit and being between said pump and said non-return valve, said by-pass means comprising a restricted flow passage communicating with said conduit for fluid discharge to said reservoir return passage, a chamber having an opening and interposed between said restricted flow passage and said conduit, a by-pass piston reciprocal within said chamber, and a by-pass non return valve displaceably seated against the opening of said chamber, and a by-pass discharge passage communicating with said chamber, a channel leading from said outlet passage and communicating with said restricted flow passage and said by-pass discharge passage for fluid discharge to said reservoir return passage, an adjustably loaded relief valve, reciprocally movable within said channel and comprising a valve piston having a first and a second land, and manual control means attached to said tractor for urging said valve piston into an equilibrium position to establish the predetermined pressure in said cylinder allowing said first land of said valve piston to block fluid communication between said restricted flow passage and said reservoir return passage permitting pressure of fluid from said pump to establish a low pressure by-pass condition by moving said by-pass piston unseating said by-pass non-return valve and letting fluid from said pump bleed from said conduit through said by-pass discharge passage and said reservoir return passage back to said reservoir; wherein increase in pressure in said cylinder due to downward forces acting on said linkage through said implement shifts said valve piston into a first displaced position allowing said second land of said valve piston to permit escape of fluid from said cylinder to said reservoir for restoring the predetermined pressure in said cylinder, and a decrease of pressure in said cylinder due to upward forces acting on said linkage through said implement shifts said valve piston into a second displaced position permitting said first land of said valve piston to terminate the low pressure bypass condition by preventing flow of fluid from said conduit through said by-pass means to said reservoir return passage leading to said reservoir permitting fluid under high pressure to be delivered by said pump through said non-return valve to said cylinder for restoring the predetermined pressure in said cylinder.

10. In a tractor having an implement attaching linkage adapted to carry an implement, a hydraulic power lift system operable for raising and lowering the implement and for selecting the operating depth of the implement by establishing a predetermined pressure in said system whereby upward and downward forces acting on the linkage at the selected operating depth of the implement are in balance, said hydraulic power lift system comprising a cylinder having an inlet passage and an outlet passage communicating therewith, a ram reciprocally disposed within said cylinder, a reservoir return passage communicating with said outlet passage, a reservoir being a source of fluid and communicating with said return passage, conduit communicating with said inlet passage, a pump receiving fluid from said reservoir and delivering fluid under high pressure through said conduit to said cylinder, a non return valve disposed within said inlet passage preventing return of fluid to said pump, a by-pass means communicating with said conduit and being between said pump and said non-return valve, said by-pass means comprising a restricted flow passage communicating with said conduit for fluid discharge to said reservoir return passage, a by-pass valve interposed between said restricted flow passage and said conduit, a channel leading from said outlet passage and communicating with said restricted flow passage and said by-pass valve for fluid discharge to said return passage, an adjustably loaded relief valve reciprocally displaceable within said channel, and manual control means attached to said tractor for urging said relief valve into an equilibrium position to establish the predetermined pressure in said cylinder and to block fluid communication between said restricted flow passage and said reservoir return passage letting fluid from said conduit through said by-pass valve means and said reservoir return passage back to said reservoir establishing a low pressure by-pass condition; wherein increase in pressure in said cylinder due to downward forces acting on said linkage through said implement shifts said relief valve into a first displaced position to permit escape of fluid from said cylinder to said reservoir for restoring the predetermined pressure in said cylinder, and a decrease of pressure in said cylinder due to upward forces acting on said linkage through said implement shifts said relief valve into a second displaced position permitting said valve piston to terminate the low pressure by-pass condition by preventing flow of fluid from said conduit through said by-pass means to said return passage leading to said reservoir permitting fluid under high pressure to be delivered by said pump through said non-return valve to said cylinder for restoring the predetermined pressure in said cylinder.

11. In a tractor having an implement attaching linkage adapted to carry an implement, a hydraulic power lift system operable for raising and lowering the implement and for selecting the operating depth of the implement by establishing a predetermined pressure in said system whereby upward and downward forces acting on the linkage at the selected operating depth of the implement are in balance, said hydraulic power lift system comprising a cylinder having an inlet passage and an outlet passage communicating therewith, a ram reciprocally disposed within said cylinder, a reservoir return passage communicating with said outlet passage, a reservoir being a source of fluid and communicating with said return passage, conduit communicating with said inlet passage, a pump receiving fluid from said reservoir and delivering fluid under high pressure through said conduit to said cylinder, a non return valve disposed within said linet passage preventing return of fluid to said pump, a by-pass means interposed between said pump and said non-return valve, a channel leading from said outlet passage and communicating with said reservoir return passage, an adjustably loaded relief valve reciprocally displaceable within said channel, and manual control means attached to said tractor for urging said relief valve into an equilibrium position to establish the predetermined pressure in said cylinder while permitting fluid from said pump to flow through said by-pass means under low pressure to said reservoir return passage and back to said reservoir, wherein increase in pressure in said cylinder due to downward forces acting on said linkage through said implement shifts said relief valve into a first displaced position to permit escape of fluid from said cylinder to said reservoir for restoring the predetermined pressure in said cylinder, and a decrease of pressure in said cylinder due to upward forces acting on said linkage through said implement shifts said relief valve into a second displaced position permitting said valve piston to terminate the low pressure by-pass condition by preventing flow of fluid from said conduit through said by-pass means to said return passage leading to said reservoir permitting fluid under high pressure to be delivered by said pump through said non-return valve to said cylinder for restoring the predetermined pressure in said cylinder.

References Cited in the file of this patent

UNITED STATES PATENTS

| | | |
|---|---|---|
| 2,405,980 | Sands et al. | Aug. 20, 1946 |
| 2,627,796 | Bunting | Feb. 10, 1953 |
| 2,689,513 | Ferguson et al. | Sept. 21, 1954 |
| 2,715,863 | Bunting | Aug. 23, 1955 |
| 2,722,873 | Garmager | Nov. 8, 1955 |
| 2,750,862 | Garmager | June 19, 1956 |
| 2,764,923 | Morgen | Oct. 2, 1956 |
| 2,799,251 | Newgen | July 16, 1957 |

FOREIGN PATENTS

| | | |
|---|---|---|
| 1,153,074 | France | Sept. 23, 1957 |
| 957,998 | Germany | Feb. 14, 1937 |
| 747,674 | Great Britain | Apr. 11, 1956 |